Dec. 13, 1960 L. E. HOYER ET AL 2,964,338
JOURNAL BOX SEAL
Filed Sept. 20, 1957
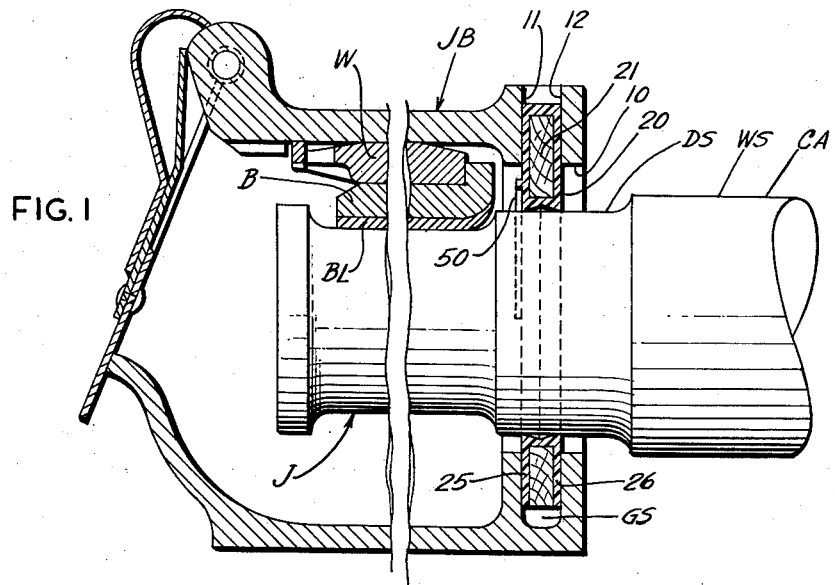
FIG. 1
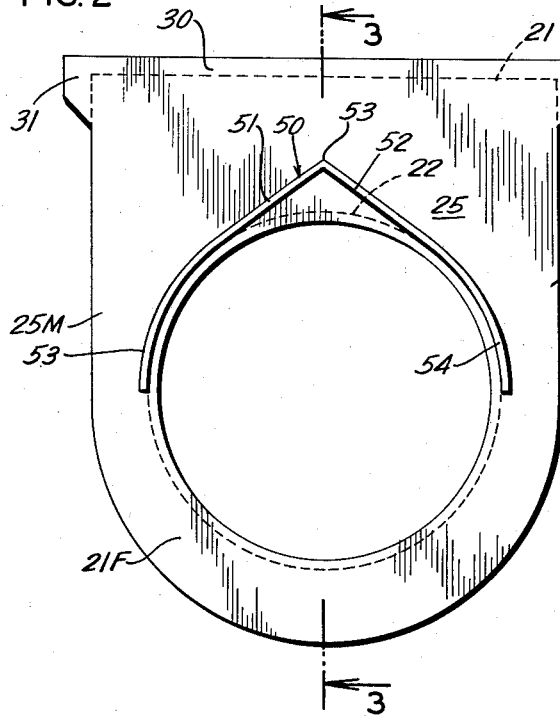
FIG. 2
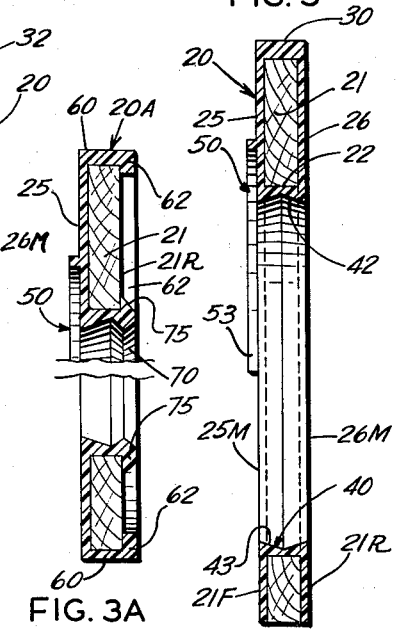
FIG. 3
FIG. 3A
INVENTORS.
LLEWELLYN E. HOYER
WILLIS LEE STEWART
BY
Wallace and Cannon
ATTORNEYS

United States Patent Office 2,964,338
Patented Dec. 13, 1960

2,964,338

JOURNAL BOX SEAL

Llewellyn E. Hoyer, Wyckoff, N.J., and Willis Lee Stewart, Suffern, N.Y., assignors to American Brake Shoe Company, New York, N.Y., a corporation of Delaware Filed Sept. 20, 1957, Ser. No. 685,190

4 Claims. (Cl. 286—6)

This invention relates to a dust guard seal for a journal box.

One of the primary problems in achieving proper and efficient lubrication of the journal of a railroad car axle has to do with the closure or sealing of the opening at the inner end of the journal box through which the journal is passed to rotate on the journal bearing supported within the journal box. Thus, a so-called dust guard is conventionally disposed in a dust guard slot in the journal box and is formed with an opening in the medial portion thereof through which the journal is passed. To be most effective, the dust guard should be in the nature of a seal capable not only of effectively sealing the journal box against the entrance of foreign matter into the journal box but also capable of effectively clasping or hugging the dust guard seat on the journal with a minimum of friction. Thus, the opening in the medial part of the dust guard through which the journal is passed has in most instances in the past been of larger diameter than the dust guard seat on the journal, and the dust guard conventionally has a rather loose fit in the dust guard slot of the journal box. These conditions have accounted for loss of lubricant from the inside of the journal box as well as contamination of lubricant due to foreign matter entering the journal box from the outside through the unsealed opening in the dust guard.

It will therefore be recognized that a satisfactory seal for the journal box of a railroad car should effectively seal off the dust guard slot and should have an effective low friction seal fit about the journal, and so to do is one of the primary objects of the present invention. Inasmuch as the journal box is often subjected to rather severe motion tending to splash lubricant in relatively large quantities about the journal, it is important that such fugitive lubricant be prevented as much as possible from being splashed onto the dust guard seat portion of the journal. In other words, there are circumstances where lubricant splashed or thrown onto the dust guard seat of the journal will be present in such large quantities as to exceed the capacity of the portion of the dust guard seal that seals off the dust guard seat of the journal, and another object of the present invention is to substantially reduce the prevalence of this condition by providing the dust guard seal with a substantially V-shaped rib which arches over and about the upper periphery of the medial opening in the dust guard seal, whereby fugitive lubricant will be drained away from the dust guard seat of the journal.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a sectional view, broken away, of a railroad journal box and an associated car axle; and showing a dust guard seal of the present invention mounted in the journal box;

Fig. 2 is a front plan view of a dust guard seal constructed in accordance with the present invention;

Fig. 3 is a sectional view taken substantially on the line 3—3 of Fig. 2; and

Fig. 3A is a fragmentary sectional view of a modified form of the invention.

In Fig. 1 of the drawing, the present invention is illustrated in connection with a standard journal box JB having the journal portion J of a railroad car axle CA disposed therein. The car axle is formed with a wheel seat WS on the outside of the journal box, and inwardly of the wheel seat the car axle is formed with a dust guard seat DS of reduced diameter, the journal J disposed within the journal box being of further reduced diameter. The journal J is passed into the journal box through a relatively large opening 10 at the inner end of the journal box, and the upper periphery of the journal J rotates on the lining BL of a standard partial bearing B. The bearing B is held in place by a wedge W which is wedged in place between the back of the bearing and top wall of the journal box JB.

For lubricating the journal J and the bearing B, a lubricator, not shown, is disposed in the bottom of the journal box below the journal and is adapted to relay lubricant in the form of oil on to the rotating journal, the bottom of the journal box serving as an oil reservoir.

A standard journal box as JB is formed with a relatively large, generally U-shaped dust guard slot GS, the opposed front and rear walls 11 and 12 of the slot GS serving to enable a dust guard to be slidably mounted therein. The sides and the bottom of the dust guard slot are closed, but the top thereof is open as will be observed in Fig. 1 to enable the dust guard to be inserted in place by a downward movement. The dust guard seal of the present invention is ilustrated at 20 in Fig. 1, and it will be realized that the dust guard seal in effect closes off the area of the opening 10 in the journal box not occupied by the journal. In the absence of such a seal or a dust guard, oil could be easily lost or splashed from the journal box from the inside and readily contaminated by foreign matter entering the journal box from the outside.

The dust guard seal 20 of the present invention is illustrated in one form in Figs. 2 and 3 and includes a relatively rigid insert plate 21 of plywood or like relatively light weight, economical rigid material. The plate 21 is generally U-shaped in configuration having parallel vertical side edges or walls, a flat top wall and a rounded bottom wall as will be appreciated from Fig. 2. The plate 21 is formed with a medial opening 22, and all other areas of the plate 21 are solid. When the seal 20 has been properly placed in position in the dust guard slot of the journal box, the medial opening 22 is centered relative to the enlarged opening 10 in the journal box to enable the journal of the car axle to be passed therethrough. As will be explained below, the portion of the car axle aligned with the dust guard slot is spaced concentrically inwardly of the opening 22, and the annular area between the opening 22 and the opposed portion of the car axle is sealed.

It is important of course that the seal 20, or so-called dust guard as it is sometimes referred to, be properly retained in place not only to prevent canting, thereby greatly increasing the likelihood of breakage, but also in order that the dust guard slot itself be effectively sealed off. In accordance with the present invention, the insert 21 or main dust guard plate is provided on at least one face thereof with resilient, oil-resistant high friction material such as polyurethane or like relatively durable sponge-like material, thereby affording a retainer and seal as will be explained in detail. In the form of the invention shown in Figs. 2 and 3, the retainer in the form of a plate is provided on both front and rear faces 21F and 21R of the insert plate 21, whereby the insert plate 21 has an inner retainer seal facing 25 and an outer retainer seal facing 26 which retainer and seal facings, as shown in Fig. 1, are disposed respectively on the face of the insert 21 facing toward the interior of the journal box and the opposite face of the insert 21 which faces toward the car wheel. The two retainer facings are of such thickness when combined with the insert 21 as to have the side marginal portions as 25M and 26M, Fig. 2, thereof tightly engaged with the opposed walls 11 and 12 of the dust guard slot, thereby attaining an effective seal engagement with the walls of the dust guard slot. It will be appreciated, however, that this is a resilient engagement allowing for vertical movement of the dust guard seal 20 in the event that there is relative vertical movement between the car axle and the journal box.

As best shown in Fig. 2, the outer marginal portions as 25M and 26M of the retainer facings 25 and 26 terminate at the outer peripheral edge of the insert 21, at least in respect of the sides and bottom of the seal, whereby the side and bottom edges of the plate 21 are exposed and bare of the retainer. However, the retainers 25 and 26 are so formed as to include an integral elongated plug 30 at the top of the plate 21 adapted to completely close off the top of the dust guard slot. It will be observed in this connection that the plug 30 has ears 31 and 32 extended outwardly of the vertical side edges of the insert plate 21 and the face plates 25 and 26. The distance between the outer extremities of the ears 31 and 32 represents the full width of the dust guard slot at the top thereof, and when installed in position and accurately centered, the marginal sides of the seal assembly 20 will be spaced slightly inwardly of the opposed side surfaces or walls of the dust guard slot.

The medial opening 22 of the plate 21 is lined with an annular seal ring 40, Fig. 3, which is integral with the retainer facings 25 and 26. Thus, in forming the dust guard seal assembly 20, the insert or primary dust guard 21 is positioned within a mold cavity so that all areas thereof with the exception of the side and bottom edges are spaced from sides of the mold cavity and the entailed cores, whereby the uncured plastic material of which the facings 25 and 26, the plug 30 and the annular seal ring 40 are formed covers such exposed areas of the plate 21. It will be appreciated that during the molding operation, the plastic material is inherently bonded to the plate 21.

The seal ring 40 is formed with at least one rib affording an edge having an annular contact with the dust guard seat portion DS of the car axle. Various different configurations may be resorted to for this purpose, and as shown in Fig. 3 the ring 40 is in effect V-notched or grooved at the medial diameter thereof to afford a pair of ribs 42 and 43 which, as shown in Fig. 1, provide a pair of spaced annular relatively sharp edges contacting the car journal J about circumferential lines only and in spaced relation thereby establishing an effective seal contact between the seal 20 and the car journal.

Under and in accordance with the present invention, the dust guard seal includes a rib on the face or side 21F thereof that faces inwardly of the journal box. The rib is identified at 50 in Figs. 1 to 8 of the drawings, and is of generally inverted V-shape so as to have divergent legs 51 and 52, Fig. 2, diverging downwardly from the top apex 53 which is centered accurately above the upper periphery of the opening 22 in the plate 21. Thus, the rib 50 arches over and about the upper periphery of the opening in the insert plate 21, and the legs 51 and 52 are extended downwardly at 53 and 54 on opposite sides of the medial opening 22 in the plate 21. As will be seen in Fig. 3, the rib 60 projects axially of the opening 22 a substantial distance, is free of the dust guard slot and the inner adjacent surface of the journal box, and overlies the portion of the journal which extends axially inwardly of the dust guard slot, and hence is effective to provide what in effect represents an eave which sheds and drains away from the car axle fugitive lubricant that may be splashed about the interior of the journal box.

In Fig. 3A there is illustrated at 20A a somewhat modified form of the dust guard seal. In most respects, the dust guard seal 20A is quite similar to the dust guard seal 20 described above, and hence the major differences only will be stressed. First, the retainer is not extended about the entire area of the rear face 21R of the plate 21 which faces outwardly of the journal box and toward the wheel seat WS of the car axle. Instead, the retainer includes but the inner seal plate or face 25, and the retainer is extended to and about the side and bottom walls of the plate 21, and lips are formed on the retainer 25 which engage but the marginal portions only of the rear face of the plate 21. Thus, in addition to the plate or facing 25, the retainer for the dust guard seal 20A is formed with a continuous flange 60 which extends continuously about the outer periphery of the plate 21. The flange 60 is integral with the plug 30 which is adapted to close off the top of the dust guard slot. On the rear face 21R of the insert plate 21, the flange 60 is directed inwardly to provide a continuous lip 62 extended about the outer marginal peripheral portion of the rear face 21R of the plate 21. Hence, it will be seen that, as in the seal 20, the retainer for the dust guard seal 20A includes two opposed sections extended about the periphery of the plate 21 at the opposed side margins of the two faces of the plate 21 thereby assuring the desired tight seal fit of the dust guard seal in the dust guard slot. The flange 60, particularly at the rounded bottom edge of the plate 21, acts as a resilient shock absorber preventing damage to the plate 21 in the event forces are encountered which tend to bring about a crushing action of the journal box on an edge of the plate 21.

The seal ring portion of the retainer, 70 in this instance, is somewhat similar to the form of seal ring 40 described above inasmuch as the seal ring 70 is V-shaped such as to provide a pair of annular ribs having adjacent sides which diverge outwardly away from the medial diameter of the seal ring 70, thereby providing a pair of spaced annular edges for engaging the journal about a pair of corresponding circumferential seal lines. The rib on the seal ring 70 having the edge adjacent the rear face of the plate 21 is provided with a radially outwardly extended annular lip 75 which extends circumferentially about a portion of the rear side 21R of the plate 21 immediately adjacent the opening 22 in the plate 21. The lip 75 thus serves to assist in stabilizing the seal ring 70.

It will be seen from the foregoing that the present invention enables a journal box and a journal disposed therein to be effectively sealed, while at the same time assuring that fugitive lubricant splashed about the interior of the journal box is drained away from the journal. These desirable advantages are conveniently attained by means of a one-piece retainer and seal that can be molded directly to the insert plate of relatively rigid material.

Hence, while we have illustrated and described preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. In a journal box for a railroad car and wherein the journal box is formed with a dust guard slot, a dust guard disposed in said dust guard slot and including a plate of relatively rigid material having opposed faces and an opening substantially in the medial portion thereof through which the journal is passed, said plate being provided with retainer means composed of resilient material in the form of two opposed sections extended about the outer margins of the two opposed faces of the plate and bearing frictionally against the opposed walls of the dust guard slot so as to have a tight seal fit therewith, and said dust guard including a substantially V-shaped inverted rib projecting axially of said opening in the direction of the interior of the journal box, said rib arching over the upper periphery of said opening and extending downwardly along the two sides of said opening closely adjacent thereto and having a substantially smooth outer surface for shedding fugitive lubricant downwardly away from said opening, the outer surface of said rib being spaced radially inward from said dust guard slot and from the inner adjacent portion of the journal box so as to be free of said dust guard slot and free of said adjacent journal box portion, and said rib overlying a portion of the car journal which extends axially inward of the journal box beyond the plane of said dust guard slot.

2. A dust guard according to claim 1 wherein the opening in said plate is lined with a resilient annular seal engaging said journal.

3. A dust guard according to claim 2 wherein the retainer means, said rib and said annular seal are integrally embodied in a one-piece molded element of resilient material.

4. In a journal box for a railroad car wherein the journal box is formed with a dust guard slot, a dust guard disposed in said dust guard slot and including a plate of relatively rigid material having opposed faces and an opening substantially in the medial portion thereof through which the journal is passed, and said dust guard including a substantially V-shaped inverted rib projecting axially of said opening in the direction of the interior of the journal box, said rib arching over the upper periphery of said opening and extending downwardly along the two sides of said opening closely adjacent thereto and having a substantially smooth outer surface for shedding fugitive lubricant downwardly away from said opening, the outer surface of said rib being spaced radially inward from said dust guard slot and from the inner adjacent portion of the journal box so as to be free of said dust guard slot and free of said adjacent journal box portion, and said rib overlying a portion of the car journal which extends axially inward of the journal box beyond the plane of said dust guard slot.

References Cited in the file of this patent

UNITED STATES PATENTS

| | | |
|---|---|---|
| 19,840 | Geisendorff et al | Apr. 6, 1858 |
| 600,797 | Patten | Mar. 15, 1898 |
| 606,232 | Patten | June 28, 1898 |
| 2,152,937 | Vigne et al. | Apr. 4, 1939 |
| 2,159,825 | Stevens | May 23, 1939 |
| 2,692,783 | Foss | Oct. 26, 1954 |